United States Patent
Kimura et al.

(10) Patent No.: US 7,916,214 B2
(45) Date of Patent: Mar. 29, 2011

(54) PICTURE DISPLAY SYSTEM FOR ADJUSTING IMAGE QUALITY OF A PICTURE SIGNAL HAVING HIGHER NUMBER OF SCANNING LINES

(75) Inventors: Katsunobu Kimura, Yokohama (JP);
Mitsuo Nakajima, Yokohama (JP);
Yoshiaki Mizuhashi, Yokohama (JP);
Haruki Takata, Yokohama (JP);
Masaaki Matsukawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1261 days.

(21) Appl. No.: 11/444,508

(22) Filed: Jun. 1, 2006

(65) Prior Publication Data

US 2006/0274204 A1 Dec. 7, 2006

(30) Foreign Application Priority Data

Jun. 1, 2005 (JP) .................. 2005-160864

(51) Int. Cl.
*H04N 7/01* (2006.01)
(52) U.S. Cl. ...................................... 348/558
(58) Field of Classification Search .............. 348/648, 348/650, 625, 603, 606, 645, 687, 673–675, 348/576, 558
See application file for complete search history.

(56) References Cited

U.S. PATENT DOCUMENTS

| | | | | |
|---|---|---|---|---|
| 4,823,190 | A * | 4/1989 | Yamamoto | 348/625 |
| 5,355,176 | A | 10/1994 | Inagaki et al. | |
| 5,673,336 | A | 9/1997 | Edgar et al. | |
| 6,043,853 | A | 3/2000 | Shimazaki et al. | |
| 6,052,312 | A * | 4/2000 | Ishii | 365/189.04 |
| 6,091,458 | A * | 7/2000 | Jeon et al. | 348/554 |
| 6,246,434 | B1 * | 6/2001 | Takashima | 348/180 |
| 7,324,164 | B2 * | 1/2008 | Kim et al. | 348/674 |
| 7,352,410 | B2 * | 4/2008 | Chou | 348/673 |
| 7,400,363 | B2 * | 7/2008 | Suga et al. | 348/687 |
| 7,450,182 | B2 * | 11/2008 | Nakajima et al. | 348/625 |
| 7,511,772 | B2 * | 3/2009 | Fujine et al. | 348/790 |

FOREIGN PATENT DOCUMENTS

| | | |
|---|---|---|
| GB | 2 241 407 | 8/1991 |
| JP | 5-244607 | 8/1991 |
| JP | 6-339151 | 5/1993 |
| JP | 9-182096 | 12/1995 |
| JP | 3167434 B2 | 3/2001 |
| JP | 2003-047019 A | 2/2003 |
| JP | 2004-289753 | 10/2004 |

OTHER PUBLICATIONS

Combined Search and Examination Report dated Feb. 28, 2007.
Japanese Office Action issued in Japanese Patent Application No. JP 2005-160864 dated Apr. 20, 2010.

* cited by examiner

*Primary Examiner* — Paulos M Natnael
(74) *Attorney, Agent, or Firm* — McDermott Will & Emery LLP (57) ABSTRACT

A picture display technique carries out an adjustment of image quality of an inputted picture signal in response to a type of the inputted picture signal, e.g., a type of a first picture signal into which a second picture signal, having fewer scanning lines than that of the first picture signal, is converted, and an original type of the first picture signal, and then displays a picture of an adjusted picture signal on a display device. Further, the adjustment of the picture quality may include at least one of hue correction of the inputted picture signal in a certain hue range and chroma correction of the inputted picture signal in a certain chroma range. The adjustment of the picture quality may also include a contour correction of the inputted picture signal.

16 Claims, 6 Drawing Sheets

FIG.2
Prior Art

Types of HD up-converted pictures (3 types)

FIG.3

| Flag signal of each circuit | | State | Logic of each flag signal |
|---|---|---|---|
| Cross-color detection circuit 105 C flag signal | | Present | 1 |
| | | Absent | 0 |
| Input-band detection circuit 106 F flag signal | | SD band | 1 |
| | | HD band | 0 |
| Program-information detection circuit 107 | EPG Keyword E flag signal | HD | 0 |
| | | SD | 1 |
| | Picture format information V flag signal | 525i | 1 |
| | | 1125i | 0 |

(1) Degree of color correction of SD/S-HD signal

| Hue range | Degree of hue correction | Degree of chroma correction |
|---|---|---|
| H-range1 | α S1 | β S1 |
| H-range2 | α S2 | β S2 |
| H-range3 | α S3 | β S3 |

(2) Degree of color correction of original HD signal

| Hue range | Degree of hue correction | Degree of chroma correction |
|---|---|---|
| H-range1 | α H1 | β H1 |
| H-range2 | α H2 | β H2 |
| H-range3 | α H3 | β H3 |
| H-range4 | α H4 | β H4 |

PICTURE DISPLAY SYSTEM FOR ADJUSTING IMAGE QUALITY OF A PICTURE SIGNAL HAVING HIGHER NUMBER OF SCANNING LINES

TECHNICAL FIELD

The present invention relates to a picture display system such as a television set. More specifically, this invention relates to a picture display system capable of the adjustment of picture quality in accordance with the formats of an inputted picture signal, e.g. formats of a digital television signal.

BACKGROUND

Digital television signals of various formats are transmitted from broadcast stations (and may be available from playback devices). Typical digital television signal may be a HD (High Definition) signal having a HD format of 1,125 total number of scanning lines (1,080 effective number of scanning lines) or a SD (Standard Definition) signal having a SD format of 525 total number of scanning lines (effective 480 number of scanning lines).

There are two types of the HD signal; i.e., a S-HD signal and an original HD signal. The S-HD signal has the HD format of 1,125 total number of scanning lines into which broadcast stations have up-converted the SD format of 525 total number of scanning lines. For example, the original HD signal may have the HD format produced from pictures taken by high-definition TV cameras. Japanese Unexamined Patent Publication No. 2004-289753 discloses a technique to distinguish between the S-HD signal and the original HD signal.

According to the above prior art, the picture quality of the S-HD signal and that of the original HD signal are corrected in accordance with their respective characteristics because the frequency bands of the S-HD signal and the original HD signal are different from each other. However, as described in the paragraph 0005 of Japanese Unexamined Patent Publication No. 2004-289753, only the sharpness (contour correction) is considered as an adjustment of picture quality in the prior art. The color-reproduction range of the S-HD signal and that of the original HD signal are different from each other, and a color-reproduction range of the S-HD signal is close to that of NTSC signal. Therefore, different approaches need to be adopted to the color correction, as the adjustment of picture quality, of the S-HD signal and that of the original HD signal. However, such different approaches are not considered in the above prior art.

Figure 2:
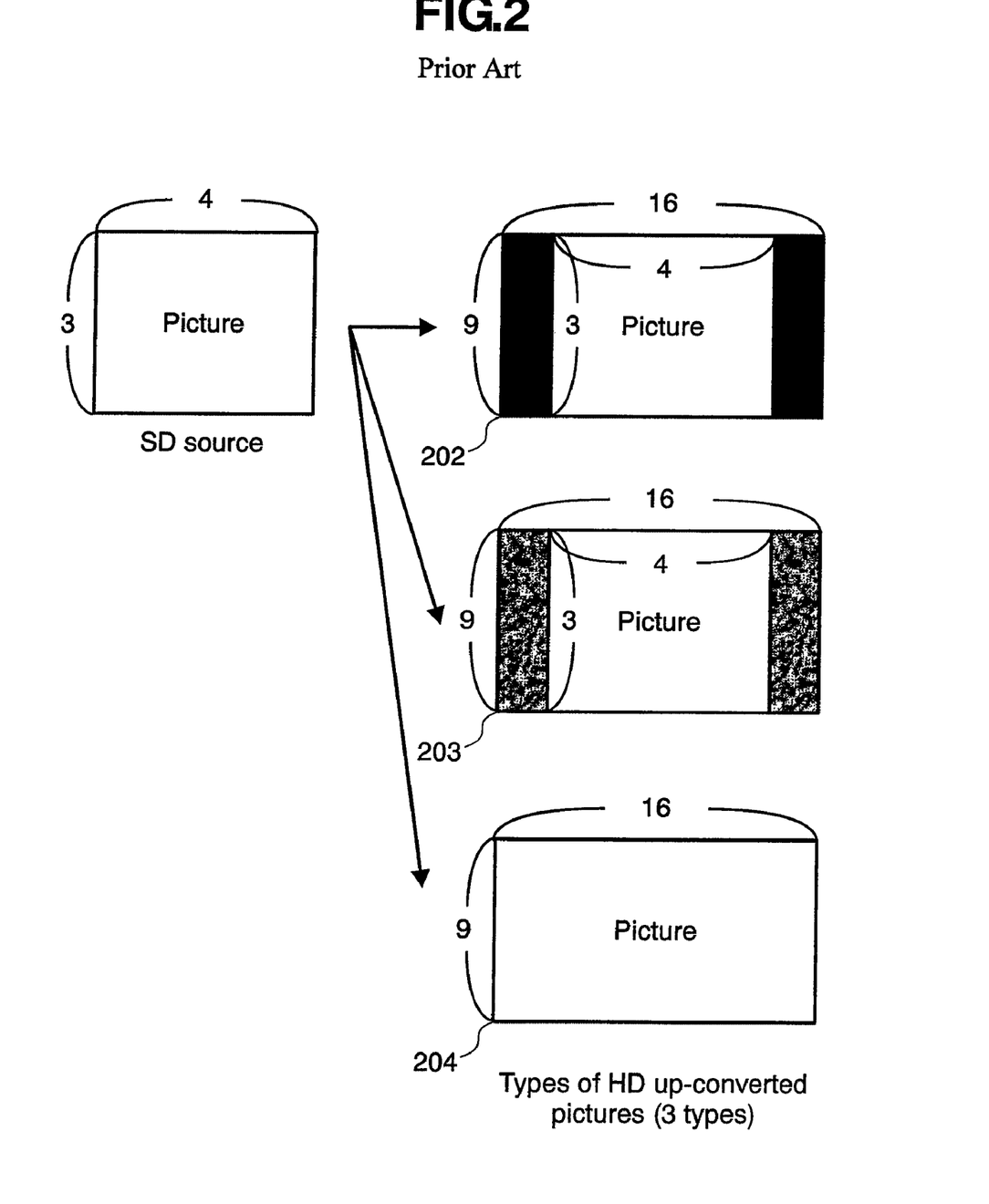
FIG. 2 shows examples of S-HD pictures.

Also, the above prior art discloses the following teachings for distinguishing between the S-HD signal and the original HD signal:
(i) to use aspect ratio information added to the digital TV signal
(ii) to detect side panels added to right and left sides of picture of the digital TV signal.
In many cases, however, such aspect ratio information is not added to the digital TV signal. In such cases, the prior art fails to distinguish between the S-HD signal and the original HD signal. Besides, the detection of side panels added to right and left sides of the picture of the digital TV signal is based on the assumption that the aspect ratio of the picture is 4:3 as shown in FIG. 2 of this application. In the case of some S-HD signals, however, the aspect ratio of the picture that is 16:9 also exists as shown by the reference numeral 204 in FIG. 2. Even if the aspect ratio of the picture is 4:3, it is difficult to detect side panels if side panels are not black, but have certain brightness as shown by the reference numeral 203 in FIG. 2 or if side panels contain certain picture images. In this case, the picture may be regarded as having the aspect ratio of 16:9. Thus, the above prior art fails to adequately distinguish between the S-HD signal and the original HD signal.

Hence a need exists for providing a technique to distinguish between the S-HD signal and the original HD signal and for providing a technique to carry out an adjustment of picture quality of both the S-HD signal and the original HD signal respectively and appropriately.

SUMMARY

The teachings herein alleviate one or more of the above noted problems with a picture display technique that carries out the adjustment of image quality of the inputted picture signal in accordance with a type of the inputted picture signal, e.g., a converted type of a first picture signal into which a second picture signal, having fewer scanning lines than that of the first picture signal, is converted, and an original type of the first picture signal, and then displays a picture of an adjusted picture signal on a display device.

In the following descriptions, the HD signal is one example of the first picture signal and the SD signal is one example of the second picture signal. Therefore, the S-HD signal is one example of the converted type of the first picture signal into which the second picture signal is converted and the original HD signal is one example of the original type of the first picture signal originally.

The adjustment of image quality may be carried out by using a first color set value for the SD signal if the inputted picture signal has is the S-HD signal and by using a second color set value for the HD signal if inputted picture signal is the original HD signal.

The determination may be made by detecting cross-color element of the inputted HD signal or using EPG (Electronic Program Guide) information.

The adjustment of the picture quality may include at least one of hue correction of the inputted picture signal in a certain hue range and chroma correction of the inputted picture signal in a certain chroma range. The adjustment of the picture quality may also include a contour correction of the inputted picture signal.

The above teachings provide a picture display system capable of better reproducing colors in accordance with the formats of inputted HD signal, reproducing in high quality the pictures of inputted HD signal, better determining whether the inputted HD signal is of the S-HD format or the original HD format, and carrying out the adjustment of picture quality appropriately in accordance with the formats of the inputted HD signal.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar element.

DETAILED DESCRIPTION

In the following detailed description, numerous specific details are set forth by way of examples in order to provide a through understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
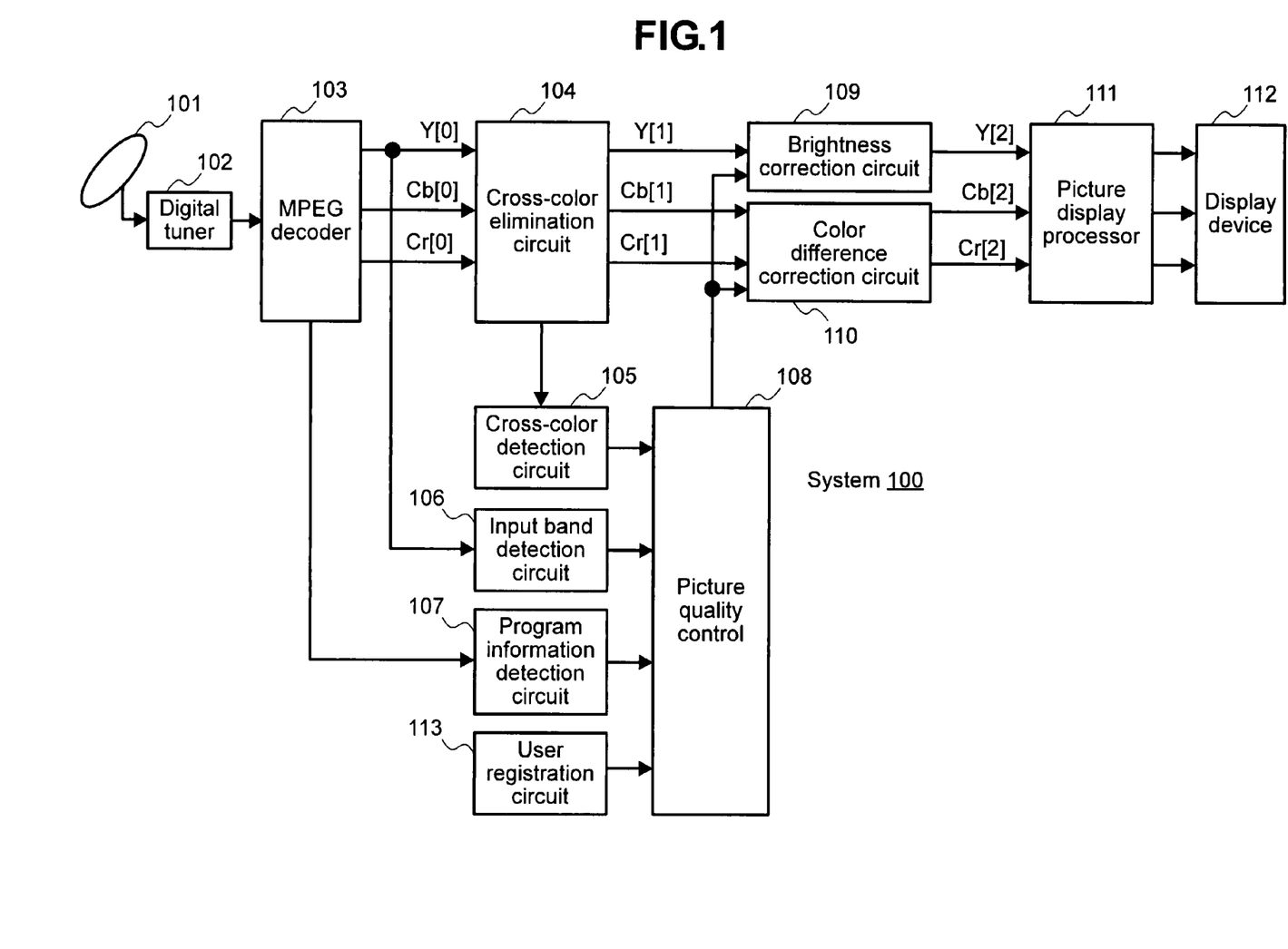
FIG. 1 shows a block diagram of an example of a picture display system.

FIG. 1 shows a block diagram of the picture display system. The picture display system may be implemented in a television set to receive digital television (DTV) signal such as ground-wave digital signal, BS/CS digital signal, and so on, and reproduce the pictures of the received DTV signal. The picture display system may be also implemented in a combination of a set-top box with a television and so on. In this example, the inputted picture signal is the DTV signal, but of course, an analog TV signal may be available.

The DTV signal is composed, for example, of MPEG (Moving Picture Expert Group) streams each including one or more digital picture signals. Each digital picture signal is compressed and encoded in the format of MPEG. There are four formats for DTV signal; i.e., (a) interlace format of 1,125 total number of scanning lines (1,080 effective number of scanning lines), (b) progressive-scanning format (progressive format) of 750 total number of scanning lines (720 effective number of scanning lines), (c) progressive format of 525 total number of scanning lines (480 effective number of scanning lines), and (d) interlace format of 525 total number of scanning lines (480 effective number of scanning lines). The picture display system will be described below, with the formats (a) and (d) taken, as examples. The DTV signal of the format (a) is called "HD signal" or "1125i signal", and the DTV signal of the format (d) is called "SD signal" or "525i signal" in the following description. Besides, the above-mentioned MPEG streams include various additional information. Included in the additional information is EPG (Electronic Program Guide) information and information about the formats of the received DTV signal, for example information for determining whether the received DTV signal is the 1125i signal or the 525i signal.

The HD signal is made in two formats as mentioned earlier; i.e., the S-HD signal having the HD format of 1,125 total number of scanning lines but into which the SD signal of 525 total number of scanning lines is up-converted by TV stations. For example, the original HD signal is an HD signal produced from pictures taken by high-definition TV cameras or originally generated in the HD format by other sources.

The three forms of S-HD pictures are shown in FIG. 2. In the example, the SD source image has a standard 4:3 aspect ratio. Up-conversion produces an image 202, 203 or 204 having a 16:9 aspect ratio. The picture 202 is a picture of the aspect ratio of 4:3 to which right-side and left-side pictureless zones are added to change the whole aspect ratio to 16:9 as part of the up-conversion to the HD format. The picture 203 is a picture of the aspect ratio of 4:3 to which right-side and left-side zones showing pictures and/or data of a certain brightness level are added to change the whole aspect ratio to 16:9. The picture 204 is a picture of the aspect ratio of 4:3 which is enlarged in the horizontal and vertical directions to assume the aspect ratio of 16:9.

The picture display system is capable of better distinguishing the S-HD signal even in the forms of reference numerals 203 and 204 from original the HD signal and correcting the quality, especially colors, of pictures appropriately. By referring to FIG. 1, the picture display system will be described in detail below.

A digital tuner 102 receives the DTV signal of a chosen TV station through an antenna 101. The received DTV signal is sent to an MPEG decoder 103, which demodulates and decodes the received DTV signal, and separates picture signal and additional information including EPG and format information. The digital picture signal decoded by the MPEG decoder 103 is sent, as a digital component signal including brightness signal Y[0], color-difference (B−Y) signal [=Cb [0]], and color-difference (R−Y) signal [=Cr [0]], to a cross color-elimination circuit 104. The workings of the cross color-elimination circuit 104 will be described in detail below.

The picture signal may be converted into a composite video signal (mixture of brightness signal Y and color-difference signal C) such as analog TV signal (NTSC signal, PAL signal, etc.) in the process of program contents production at the broadcast station. If a component signal for the DTV signal is produced from such composite video signal by, for example, two-dimensional Y-C separation at the broadcast station, cross-color disturbance may occur depending on picture patterns. The reason of occurrence of the cross-color disturbance is that it is difficult to completely separate the brightness signal Y and color-difference signal C and therefore a part of the brightness signal is still mixed in the separated color-difference signal. If a white caption, for example, is superimposed on a picture, cross-color disturbance along the edge of the caption is liable to occur. Besides, the HD signal is often produced from an analog TV signal having the SD format, namely composite video signal. In this case, cross-color disturbance may also occur because of the above reason. The cross-color elimination circuit 104 eliminates such cross-color disturbance by eliminating elements causing cross-color disturbance from the above digital component signal.

To be specific, the cross-color elimination circuit 104 determines whether each pixel is of a static or dynamic image by using the brightness signal Y[0]. Then, the cross-color elimination circuit 104 applies filtering process in the direction of time (the direction of frames) to each pixel of static images included in each of the color difference signals Cb[0] and Cr [0] independently. This filtering process includes adding together pixels at a certain place in the signal of two successive frames and dividing the sum by 2. By the filtering process, the cross-color is eliminated because cross-color elements occurring in two opposite directions between two successive frames (namely, antipolarity cross color elements) are offset by each other.

The color-difference signals Cb[1] and Cr[1] after the elimination of the cross-color elements are sent to a color correction circuit 110 from the cross-color elimination circuit 104. On the other hand, the brightness signal Y[0] is delayed by the same time as necessary for the elimination of the cross color and sent as brightness signal Y[1] to a brightness correction circuit 109. When the received DTV signal is of a static image, the cross-color elimination circuit 104 calculates the difference between two successive fields and sends a differential signal as information about cross-color element to a cross-color detection circuit 105.

The cross-color detection circuit 105 integrates the differential signal over time and compares the integrated differential signal and a prescribed threshold value. When the integrated differential signal is smaller than the prescribed threshold value, the cross-color detection circuit 105 determines that the received DTV signal does not include cross color element and produces a C flag signal of "0." When the integrated differential signal is larger than the prescribed threshold value, the cross-color detection circuit 105 determines that the received DTV signal includes cross-color element and produces a C flag signal of "1." The C flag signal is sent to a picture quality controller 108. Instead of receiving the differential signal from the cross-color elimination circuit 104, the cross-color detection circuit 105 may receive at least one of the color-difference signal Cb [0] and the color-difference signal Cr [0] from the cross-color elimination circuit 104. In this case, the cross-color detection circuit 105 calculates the difference between two successive fields by using at least one of the color-difference signal Cb[0] and the color-difference signal Cr[0] and compares the difference and the threshold value.

On the other hand, the additional information separated from the inputted picture signal by the MPEG decoder 103 is sent to a program information detection circuit 107. The program information detection circuit 107 has a format determination function for determining whether the received DTV signal is of the HD or SD format by using the additional information and search function for searching for prescribed keyword in the character-form information included in the EPG information. The format determination function is easily implemented by using format information included in the additional information. When the format information indicates 1125i, the program information detection circuit 107 determines that the received DTV signal is the HD signal and produces a V flag signal of "0." When the format information indicates 525i, the program information detection circuit 107 determines that the received DTV signal is the SD signal and produces a V flag signal of "1." The V flag signal is sent to the picture quality controller 108.

The search function of the program information detection circuit 107 is implemented by using the character-form information included in the EPG information as mentioned above. The EPG information includes character-form information to present the performers of the program an/or the summary of the program as well as information such as the channels, start and finish times, and the title of the program. The character-form information is composed of the ASCII code or the like. If a TV program is of high definition, the character-form information to present the summary of the program may include words such as "high-definition broadcast," "HD broadcast," and "high-definition picture." The program information detection circuit 107 stores keyword such as "high definition" and "HD" relating to high-definition broadcasting in a memory in advance and searches for such keyword in the character-form information included in the EPG information. When one or more keywords is hit, the program information detection circuit 107 determines that the received DTV signal is the original HD signal and produces an E flag signal of "0." When no keyword is hit, the program information detection circuit 107 determines that the received DTV signal is the SD or S-HD signal and produces an E flag signal of "1." The E flag signal is sent to the picture quality controller 108.

The brightness signal Y [0] outputted from the MPEG decoder 103 are sent to an input band detection circuit 106 in addition to the cross-color elimination circuit 104. The input band detection circuit 106 produces high frequency band signal from the inputted brightness signal Y[0] and detects the picture frequency band. For example, the input band detection circuit 106 makes a frequency histogram over a period of one field or frame of pictures, the x-axis representing frequency, the y-axis representing the frequency of occurrence (the number of pixels) Thus, the number of pixels corresponding to each frequency component over a period of one field or frame of pictures is detected. The picture frequency band of the TV signal having the SD format is about 4.2 MHz and that of TV signal having the HD format is about 8 MHz. Accordingly, When the frequency of occurrence (the number of pixels) in the frequency range of 0-4.3 MHz is higher than a reference value and the frequency of occurrence (the number of pixels) in the frequency range over 4.3 MHz is lower than the reference value, the input band detection circuit 106 determines that the received DTV signal is the S-HD signal and produces an F flag signal of "1." When the frequency of occurrence (the number of pixels) in a certain frequency range centering on 8 MHz is higher than a reference value, the input band detection circuit 106 determines that the received DTV signal is the original HD signal and produces an F flag signal of "0." The F flag signal is sent to the picture quality controller 108.

Figure 3:
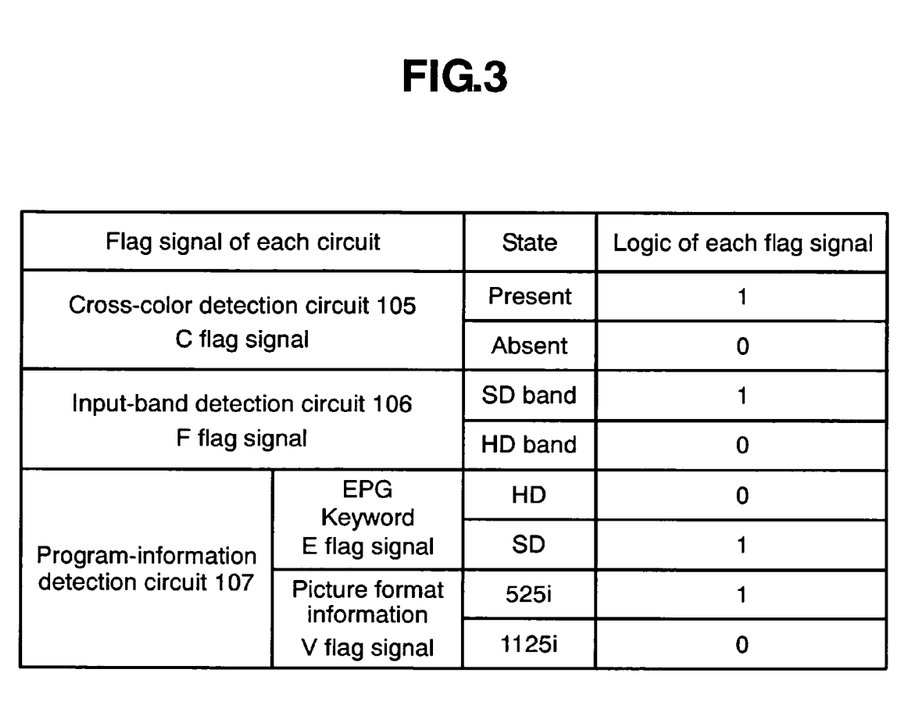
FIG. 3 shows a table of the kinds and logic of flag signal used by the picture display system of FIG. 1.

The table of FIG. 3 shows the conditions for the production of the above C flag signal by the cross-color detection circuit 105, the above F flag signal by the input band detection circuit 106, and the above E and V flag signal by the program information detection circuit 107. As shown in the table, the logic of flag signal of each circuit is determined based on the states of signal inputted into each circuit.

The picture quality controller 108 has a microcomputer and controls the brightness correction circuit 109 and the color correction circuit 110 in accordance with the above flag signal. By referring to the flowchart of FIG. 4, an example of the processing by the picture quality controller 108 will be described below. The color correction circuit 110 has the color management function including hue correction and/or chroma correction (deepness or lightness of color) in certain hue ranges (for example, hue ranges of red, blue, and green) by using the inputted color-difference signals. The brightness correction circuit 109 has the function of doing enhancer treatment (contour correction) to the inputted brightness signal.

Figure 4:
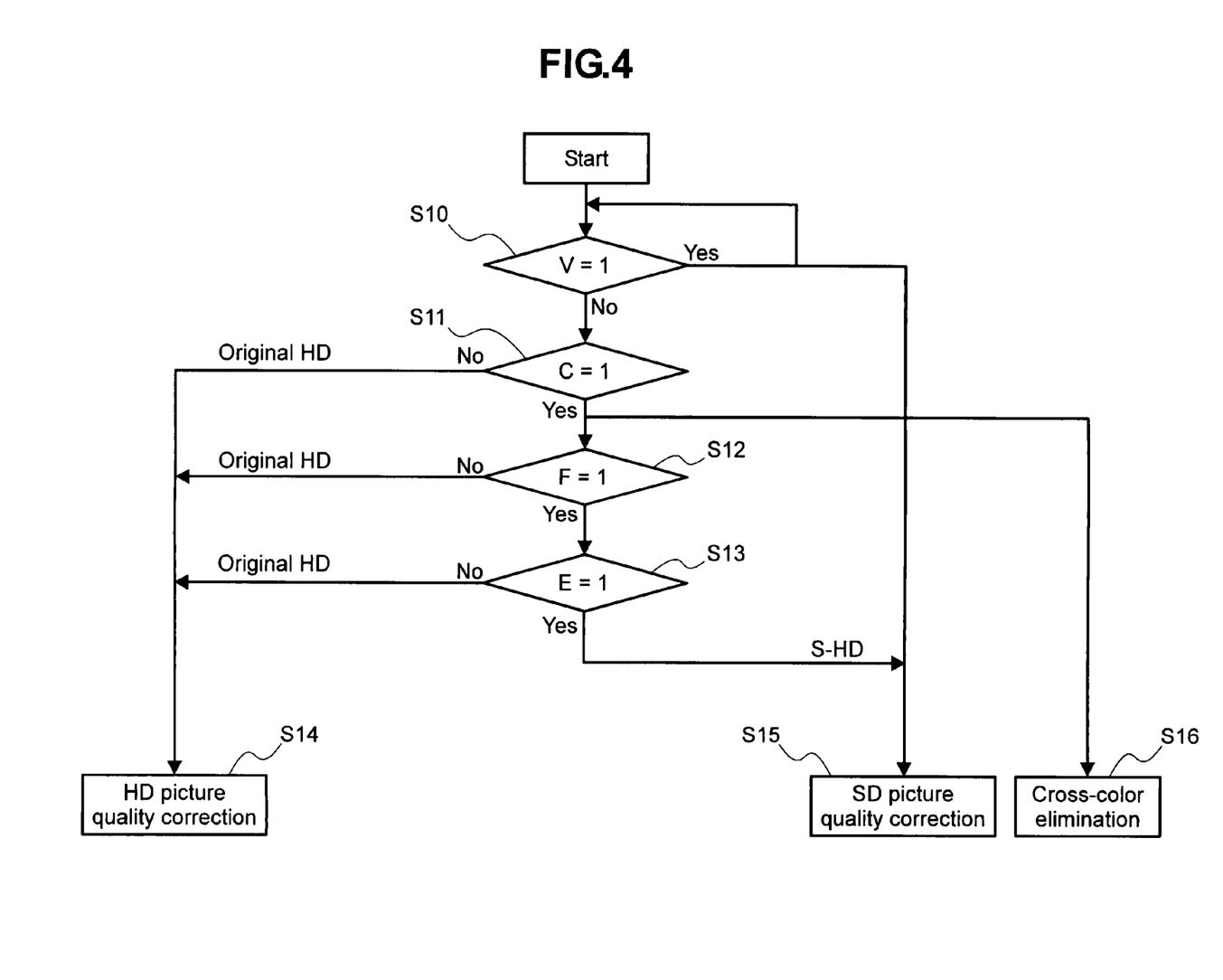
FIG. 4 shows a flowchart of an example of the processing by the picture-quality correction controller of the picture display system of FIG. 1.

In Step 10 of the flowchart of FIG. 4, the picture quality controller 108 judges the logic of the V flag signal. When the logic of the V flag signal is "1," the picture quality controller 108 determines that the received DTV signal is the SD signal of 525i and goes to Step 15. In Step 15, the picture quality controller 108 sends the first control signal to the brightness correction circuit 109 and the color correction circuit 110, instructing each to carry out an adjustment of picture quality suitable for the SD signal. When the logic of the V flag signal is "0," the picture quality controller 108 determines that the received DTV signal is the HD signal of 1125i and goes to Step 11.

In Steps 11, 12, and 13, the picture quality controller 108 determines whether the received DTV signal is an original HD signal or an S-HD signal. In Step 11, the picture quality controller 108 judges the logic of the C flag signal. When the logic of the C flag signal is "0," the picture quality controller 108 determines that the received DTV signal is the original HD signal and goes to Step 14. In Step 14, the picture quality controller 108 sends the second control signal to the brightness correction circuit 109 and the color correction circuit 110, instructing each to carry out an adjustment of picture quality suitable for the HD signal. On the other hand, When the logic of the C flag signal is "1", the received DTV signal contains a cross-color element. Therefore, the picture quality controller 108 goes to Step 12 and to Step 16.

In Step 16, the picture quality controller 108 controls the system 100 so as to activate the cross-color elimination circuit 104 to eliminate cross color. In Step 12, the picture quality controller 108 judges the logic of the F flag signal. When the logic of the F flag signal is "0," the picture quality controller 108 determines that the received HD signal is the original HD signal and goes to Step 14. In Step 14, the picture quality controller 108 controls the above described adjustment of picture quality. When the logic of the F flag signal is "1", the picture quality controller 108 goes to Step 13. In Step 13, the picture quality controller 108 judges the logic of the E flag signal. When the logic of the E flag is "0," the picture quality controller 108 determines the received HD signal is the original HD signal and goes to Step 14. On the other hand, when the logic of the E flag signal is "1," the picture quality controller 108 determines that the received HD signal is the S-HD signal that the SD signal has been up-converted into and goes to Step 15. In Step 15, the picture quality controller 108 controls the above described adjustment of picture quality.

In the examples described above, all of the V flag signal, C flag signal, F flag signal, and E flag signal are used to determine whether to apply the adjustment of picture quality suitable for the SD signal or the adjustment of picture quality suitable for the HD signal. However, it is not necessary to use all of them. For example, as shown in FIG. 5, the control of the adjustment of picture quality may be performed by using anyone of the combinations of the V flag signal and C flag signal, V flag signal and F flag signal, or V flag signal and E flag signal.

Figure 5:
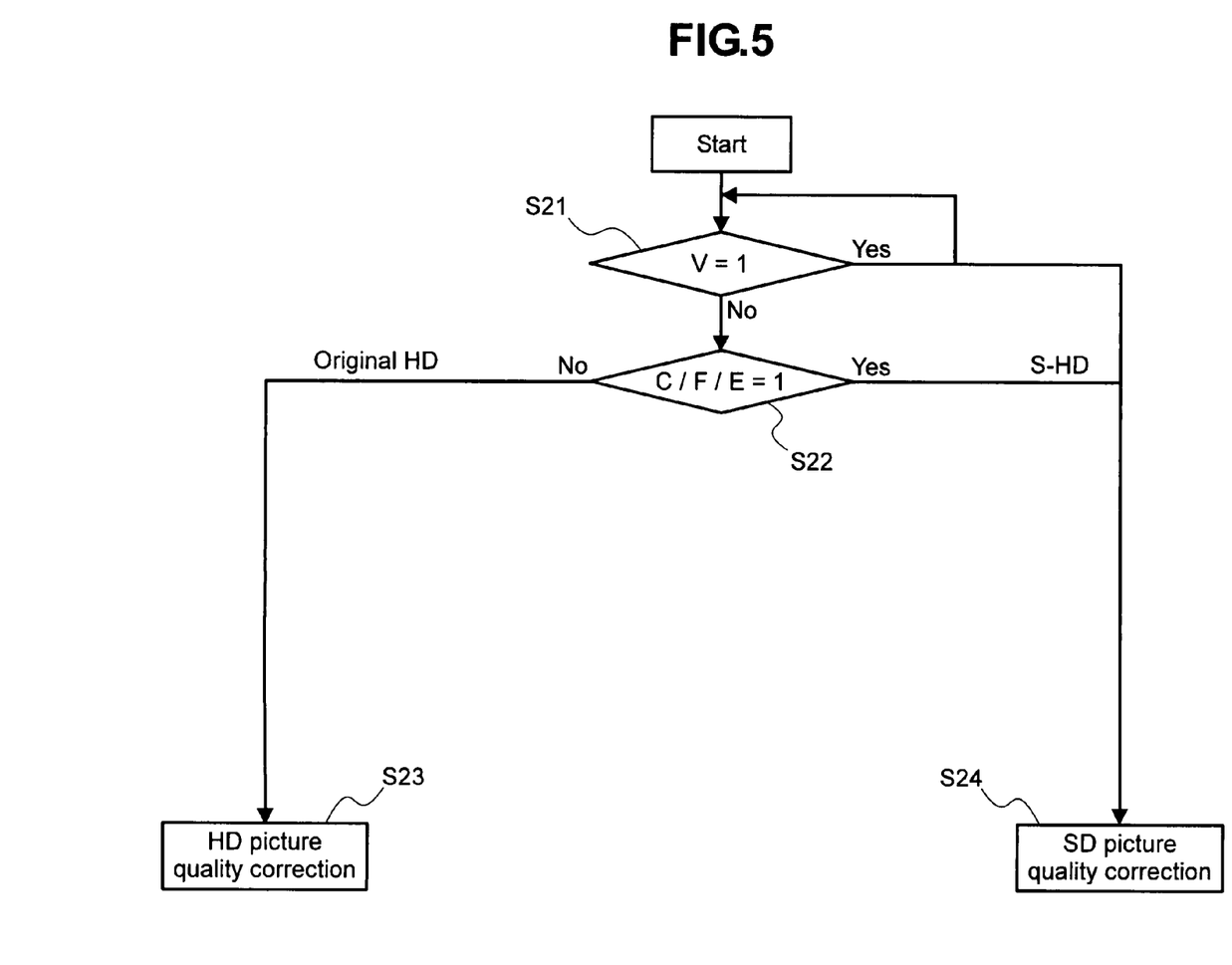
FIG. 5 shows a flowchart of another example of the processing by the picture-quality correction controller of the picture display system of FIG. 1.

Namely, in Step 21 of FIG. 5, the picture quality controller 108 judges the logic of the V flag signal. When the logic of the V flag signal is "1," the picture quality controller 108 determines that the received DTV signal is the SD signal of 525i and goes to Step 24. In Step 24, the similar processing as in Step 15 of FIG. 4 is performed. On the other hand, when the logic of the V flag signal is "0," the picture quality controller 108 goes to Step 22 and judges the logic of C, F, or E flag signal. When the logic of C, F, or E flag signal is "0," the picture quality controller 108 determines that the received HD signal is the original HD signal and goes to Step 23. In Step 23, the similar processing as in Step 14 of FIG. 4 is performed. On the other hand, When the logic of C, F, or E flag signal is "1," the picture quality controller 108 determines that the received HD signal is the S-HD signal and goes to Step 24. In Step 24, the similar processing as in Step 15 is performed. Further, in the flowchart of FIG. 5, the explanation of the cross-color elimination is omitted because of repetition of the explanation.

In this example, a picture quality adjustment circuit includes the brightness correction circuit 109 and the color correction circuit 110. Both are controlled by a first control signal and a second control signal from the picture quality controller 108 and adjust picture quality. In this example, mainly two kinds of the adjustment of picture quality, i.e., color correction and contour correction, are performed by the picture quality adjustment circuit. First, the color correction will be described.

The SD signal and the HD signal have different color reproduction range due to use of different television cameras in broadcast stations or due to use of different signal formats. For example, the color reproduction range of the SD signal is close to that of the NTSC signal, and is different from that of the HD signal. Therefore, in this example, different color (hue/chroma) corrections are applied to the SD signal and the HD signal, respectively.

Figure 6:
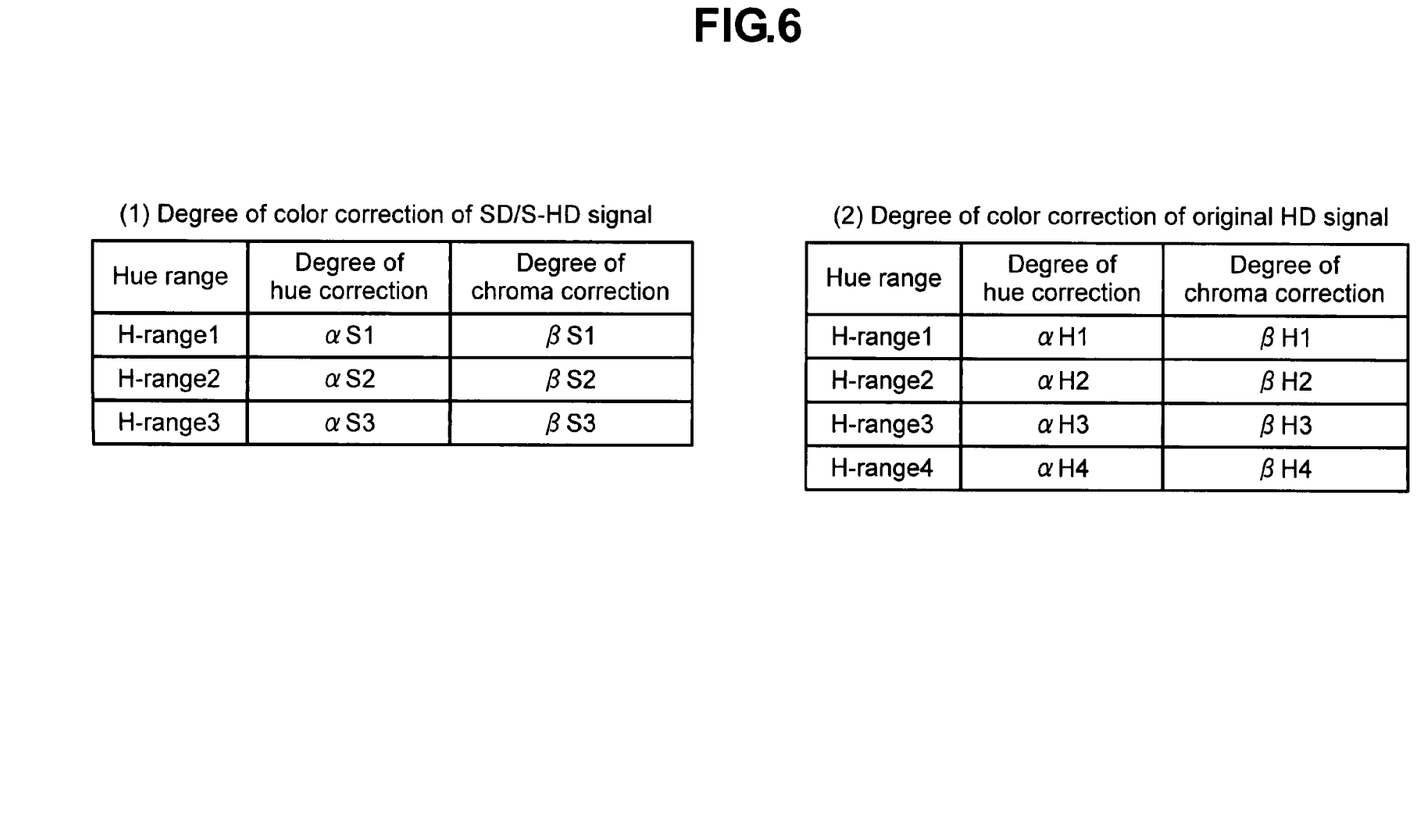
FIG. 6 shows tables of degrees of color correction in accordance with examples.

FIG. 6 shows examples of degrees of color corrections. As shown in FIG. 6, with respect to the SD signal and the S-HD signal, for example, three hue ranges are set. Further, with respect to each hue range, degrees of hue and chroma corrections are set. Also, with respect to the original HD signal, for example, four hue ranges are set. Further, with respect to each hue range, degrees of hue and chroma corrections are set.

When correcting color, first, the color correction circuit 110 performs an arithmetic operation according to expression (1) by using two color-difference signal and works out a hue signal "H". The color correction circuit 110 also performs an operation according to expression (2) and produces a chroma signal "S".

$$H = \tan^{-1}(Cr/Cb) \tag{1}$$

$$S = (Cb^2 + Cr^2)^{1/2} \tag{2}$$

The picture quality controller 108 has two tables of color correction set values as shown in FIG. 6 for the SD/S-HD signals and for the original HD signal. When the picture quality controller 108 determines that the received DTV signal is the SD signal or S-HD signal, the picture quality controller 108 chooses table (1) of FIG. 6. Then, the picture quality controller 108 outputs, as the above first control signal, a hue range, a degree of hue correction, and a degree of chroma correction corresponding to the table (1) to the color correction circuit 110.

When the hue signal "H" worked out by the expression (1) is in the hue ranges of H-range1, H-range2, or H-range3 inputted from the picture quality controller 108, the color correction circuit 110 adds degrees of hue corrections αS1, αS2, and αS3 to corresponding hue signal "H", respectively. For example, the degree of hue correction αS1 is added to the hue signal H in the hue range of the H-range1. The similar processing is applied with respect to the H-range 2 and H-range3. In this manner, color in a designated hue range is adjusted.

Further, when the chroma signal "S" worked out by using the expression (1) is in the hue ranges of H-range1, H-range2, or H-range 3 inputted from the picture quality controller 108, the color correction circuit 110 multiples chroma signal "S" with corresponding degrees of hue corrections βS1, βS2, and βS3, respectively. For example, the color correction circuit 110 multiples a chroma signal "S" in the H-range1 with the degree of chroma correction βS1. The similar processing is applied with respect to the H-range2 and H-range3. In this manner, deepness or lightness of color in the designated hue range is adjusted.

Further, in this example, the color correction circuit 110 is provided at a subsequent stage downstream of the cross-color elimination circuit 104. With this construction, the color correction is prevented from being performed before cross-color elimination and hence an error of elimination cross-color by the color correction is prevented.

Further, when the picture quality controller 108 determines that the received DTV signal is the original HD signal, the picture quality controller 108 chooses the table (2) of FIG. 6. Then, as the above second control signal, the picture quality controller 108 outputs the hue range, degree of hue correction, and degree of chroma correction corresponding to the table (2) to the color correction circuit 110. When the hue signal H worked out by using the expression (1) is in the hue ranges of the H-range1, H-range2, H-range3, or H-range4 inputted by the picture quality controller 108, the color correction circuit 110 adds the corresponding degrees of hue correction $\alpha H1$, $\alpha H2$, $\alpha H3$, and $\alpha H4$ to corresponding hue signal "H", respectively. For example, the color correction circuit 110 adds the degree of hue correction $\alpha H1$ to the hue signal "H" in the hue range of the H-range1. The similar processing is applied with respect to the H-ranges2, H-range3 and H-range4. In this manner, color in the designated hue range is adjusted.

Further, when the chroma signal "S" worked out by using the expression (1) is in the hue ranges of the H-range1, H-range2, and H-range3 inputted from the picture quality controller 108, the color correction circuit 110 multiples chroma signal "S" with the corresponding degrees of chroma correction $\beta H1$, $\beta H2$, $\beta H3$, and $\beta H4$, respectively. For example, the color correction circuit 110 multiplies the chroma signal "S" in the hue range of the H-range1 with the degree of chroma correction $\beta H1$. The similar processing is applied with respect to the H-range2, H-range3, and H-range4. In this manner, deepness or lightness in the designated hue range is adjusted.

In the above examples, as the hue ranges to adopt the hue and chroma correction, three ranges are provided for the SD/S-HD signals and four ranges are provided for the original HD signal. However, the number of ranges is not limited to the above. Needless to say, the number of ranges may be more than examples or less than those shown in FIG. 6. In the above example, the number of hue ranges for the SD/S-HD signals and the number of hue ranges for the original HD signal are different. However, the above numbers may be the same.

Now, the contour correction (enhancer treatment) will be described below. Generally, in a television system, for the reason that the picture frequency band of the SD signal and that of the HD signal are different and the other reasons, the peak frequency value of the contour to be enhanced is varied and the appropriate adjustment of picture quality is performed accordingly.

A horizontal enhancer treatment for correcting a contour (edge) in the horizontal direction of the picture will be described as an example. For example, a central frequency of the edge to be enhanced of the SD signal is made to be lower than that of the HD signal. Accordingly, effective edge enhancement corresponding to the signal type can be performed, producing a sharp, well-defined picture. Depending on whether the received DTV signal is the SD signal/S-HD signal or the original HD signal, the brightness correction circuit 109 changes a center frequency (peak frequency of the picture) of the edge to be enhanced and applies the enhancer treatment.

For example, When the received DTV signal is the SD signal/S-HD signal, a signal around a peak frequency of 2.5 MHz is enhanced. When the received DTV signal is the original HD signal, a signal around a peak frequency of 8 MHz is enhanced. Namely, when the picture quality controller 108 determines that received DTV signal is the SD signal/S-HD signal, the picture quality controller 108 sends, as the above first control signal, a control signal for setting a peak frequency signal to about 2.5 MHz to the brightness correction circuit 109. Further, when the picture quality controller 108 determines that the received DTV signal is the original HD signal, the picture quality controller 108 sends, as the above second control signal, a control signal for setting the peak frequency to about 8 MHz to the brightness correction circuit 109.

The brightness signal Y[2] outputted from the brightness correction circuit 109 and two color-difference signals Cb[2] and Cr[2] outputted from the correcting circuit 110 are inputted to the picture display processor 111. Furthermore, the color correction circuit 110 performs an arithmetic operation according to expressions (3) and (4) by using the adjusted hue signal "Ha" and the adjusted chroma signal "Sa" based on the table shown in the FIG. 6.

$$Cr = Sa * \cos Ha \quad (3)$$

$$Cb = Sa * \sin Ha \quad (4)$$

By the arithmetic operation, the color correction circuit 110 produces two color-difference signals Cb[2] and Cr[2].

The picture display processor 111 carries out matrix-transform. The picture display processor 111 produces a digital RGB signal by the matrix transform and supplies it to a display device 112. This display device 112 is comprised of a PDP, an LCD, an FED or the like, and displays pictures based on the digital RGB signal.

According to this example, there is provided a picture display system capable of better determining whether the inputted HD signal is of the S-HD format or the original HD format. Further, in accordance with this example, the picture display system is able to carry out the color correction and the contour correction appropriately based on the above determination. Further, for determining whether the inputted HD signal is of the S-HD format or the original HD format, when the cross-color element, the frequency band information of the inputted picture signal, and program information are combined and used for the finding, an HD picture and an SD picture can be distinguished with higher precision.

Alternatively, it is also possible that the determination whether the inputted HD signal is of the S-HD format or the original HD format is implemented by using time and channel information included in the EPG information. Also, when a particular program is broadcast by using the S-HD signal, it is possible to make a user choose either SD picture quality or HD picture quality as picture quality of the program. This choice is made, for example, by operating a user-registered circuit including a plurality of switches or keys.

Though not described in this example, the determination whether the inputted HD signal is of the S-HD format or the original HD format may be implemented by detecting dot disturbance instead of cross-color disturbance. The cross-color elimination circuit 104 and the cross-color detecting circuit 105 may implement the following procedure. The dot disturbance is detected, for example, by using the brightness signal Y[0]. The reason of occurrence of the dot disturbance is that it is difficult to completely separate the brightness signal Y and color-difference signal C and therefore a part of the color-difference signal is still mixed in the separated brightness signal. For example, as in the detection of the cross-color element, when an inputted picture is a still picture, brightness signals of two successive frames are added to each other. The dot disturbance may occur in two successive frames in the opposite directions to each other. Therefore, as a result of the above addition, when a component of the dot disturbance is equal to or less than a prescribed threshold, the dot disturbance is not included. Otherwise, the dot disturbance is included.

Further, for example, when the dot disturbance is included in the brightness signal Y[0], the received DTV signal having an HD format is recognized as having the S-HD format. When the dot disturbance is not included, the received DTV signal is recognized as having the original HD format. With respect to an adjustment of picture quality based on the determination, description of the above example should be referred to. Also, in the construction of FIG. 1, a circuit which eliminates dot disturbance may further be incorporated between the MPEG encoder 103 and the picture quality adjustment circuit that includes the brightness correction circuit 109 and the color correction circuit 110, like the cross color elimination circuit 104.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A picture display system, comprising:
   a display device which displays a picture in response to an adjusted picture signal;
   a picture quality adjustment circuit which carries out an adjustment of picture quality of an inputted picture signal to produce the adjusted picture signal for the display device; and
   a controller which controls the adjustment of picture quality by the picture quality adjustment circuit, in response to determining:
   (a) when the inputted picture signal is a converted type of a first picture signal into which a second picture signal, having fewer scanning lines than that of the first picture signal, is converted, and
   (b) when the inputted picture signal is an original type of the first picture signal,
   wherein the controller determines the type of the inputted picture signal by using electronic program guide information inputted together with the inputted picture signal.

2. A picture display system according to claim 1, wherein the controller searches certain keyword among character-form information included in the electric program guide information to determine the type of the inputted picture signal.

3. A picture display system according to claim 1, wherein the first picture signal is a high definition signal of 1,125 total number of scanning lines.

4. A picture display system according to claim 1, wherein the second picture signal is a standard definition signal of 525 total number of scanning lines.

5. A picture display system according to claim 1, wherein the picture quality adjustment circuit includes a color correction circuit which carries out at least one of hue correction of the inputted picture signal in a certain hue range and chroma correction of the inputted picture signal in a certain chroma range.

6. A picture display system according to claim 1, wherein the picture quality adjustment circuit includes a contour correcting circuit which carries out contour correction of the inputted picture signal.

7. A picture display system, comprising:
   a display device which displays a picture in response to an adjusted picture signal;
   a picture quality adjustment circuit which carries out an adjustment of picture quality of an inputted picture signal to produce the adjusted picture signal for the display device; and
   a controller which controls the adjustment of picture quality by the picture quality adjustment circuit, in response to determining:
   (a) when the inputted picture signal is a converted type of a first picture signal into which a second picture signal, having fewer scanning lines than that of the first picture signal, is converted, and
   (b) when the inputted picture signal is an original type of the first picture signal,
   wherein the picture quality adjustment circuit carries out color correction by using a first color set value for the second picture signal when the inputted picture signal is the converted type of the first picture signal, and by using a second color set value for the first picture signal when the inputted picture signal is the original type of the first picture signal.

8. A picture display system comprising:
   a display device which displays a picture in response to an adjusted picture signal;
   a picture quality adjustment circuit which carries out an adjustment of picture quality of an inputted picture signal to produce the adjusted picture signal for the display device;
   a cross-color detection circuit which detects a cross-color element from the inputted picture signal; and
   a controller which controls the adjustment of picture quality by the picture quality adjustment circuit in accordance with the result of the detection by the cross-color detection circuit,
   wherein the controller determines whether the inputted picture signal is a first high definition signal into which a standard definition signal is up-converted or a second high definition signal originally having a high definition format by detecting the cross-color element from the inputted picture signal.

9. A picture display system according to claim 8, further comprising a cross-color elimination circuit which eliminates the cross-color element from said inputted picture signal.

10. A picture display system according to claim 8, wherein the cross-color detection circuit detects the cross-color element from color signal components included in the inputted picture signal.

11. A picture display system according to claim 8, wherein the picture quality adjustment circuit includes a color correction circuit which carries out at least one of hue correction of the inputted picture signal in a certain hue range and chroma correction of the inputted picture signal in a certain chroma range.

12. A picture display system according to claim 8, wherein the picture quality adjustment circuit includes a contour correction circuit which carries out contour correction of the inputted picture signal.

13. A picture display system according to claim 9, wherein:
    the picture quality adjustment circuit includes a color correction circuit which carries out at least one of hue correction of the inputted picture signal in a certain hue range and chroma correction of the inputted picture signal in a certain chroma range; and
    the color correction circuit is at a stage downstream from the cross-color elimination circuit.

14. A picture display system, comprising:
    a display device which displays a picture in response to an adjusted picture signal;
    a picture quality adjustment circuit which carries out an adjustment of picture quality of an inputted picture signal to produce the adjusted picture signal for the display device; and a controller which controls the adjustment of picture quality by the picture quality adjustment circuit, in response to determining by using an electronic program guide information:
- (a) when the inputted picture signal is a converted type of a first picture signal into which a second picture signal, having fewer scanning lines than that of the first picture signal, is converted, and
- (b) when the inputted picture signal is an original type of the first picture signal, wherein the controller searches certain keyword among character-form information included in the electronic program guide information to determine the type of the inputted picture signal.

15. A picture display system according to claim 14, wherein the picture quality adjustment circuit includes a color correction circuit which carries out at least one of hue correction of the inputted picture signal in a certain hue range and chroma correction of the inputted picture signal in a certain chroma range.

16. A picture display system according to claim 14, wherein the picture quality adjustment circuit includes a contour correcting circuit which carries out contour correction of the inputted picture signal.

* * * * *